United States Patent [19]

Toth

[11] 4,068,781
[45] Jan. 17, 1978

[54] HOT AND COLD BEVERAGE VENDOR

[75] Inventor: Bartholomew L. Toth, St. Louis, Mo.

[73] Assignee: UMC Industries, Inc., Stamford, Conn.

[21] Appl. No.: 664,634

[22] Filed: Mar. 8, 1976

[51] Int. Cl.$^2$ ............................................. B67D 5/06
[52] U.S. Cl. ..................................... 222/52; 222/76; 222/129.1; 219/485
[58] Field of Search ........................ 222/52, 63, 64, 76, 222/129.1–129.4, 146 R, 146 C; 307/35; 219/485, 482, 483; 417/44, 45; 194/13

[56] References Cited

U.S. PATENT DOCUMENTS

| | | | |
|---|---|---|---|
| 1,194,165 | 8/1916 | Fry | 219/485 X |
| 2,853,208 | 9/1958 | Paulding | 222/76 |
| 3,578,126 | 5/1971 | Adams | 222/146 R |

Primary Examiner—Robert B. Reeves
Assistant Examiner—Joseph J. Rolla
Attorney, Agent, or Firm—Koenig, Senniger, Powers and Leavitt

[57] ABSTRACT

A vendor for hot and cold beverages having a hot water tank for supplying hot water for hot beverages (e.g., coffee, tea, soup, chocolate), an electrical heater for heating water in the tank, a carbonator for supplying carbonated water for cold carbonated beverages, a water pump for pumping water to the carbonator or for cold non-carbonated beverages, a refrigeration system including a compressor providing refrigeration for cooling the water for vending cold beverages, and a system for reducing the current drawn by the heater when there is a demand for heating water in the tank and the compressor or the pump is in operation, so as to maintain the current drawn by the vendor below a maximum current rating.

1 Claim, 2 Drawing Figures

HOT AND COLD BEVERAGE VENDOR

BACKGROUND OF THE INVENTION

This invention relates to a vendor for both hot and cold beverages, and more particularly to such a dual vendor with a current limiting system for maintaining the current drawn by the vendor below a maximum current rating.

The invention involves a dual vendor for vending either hot beverages, such as coffee, tea, soup and chocolate or cold beverages, such as carbonated or non-carbonated soft drinks, having a hot water tank for supplying hot water for the hot beverages, a water pump for pumping water for the cold beverages, and a refrigeration system including a compressor providing refrigeration for cooling the water (and syrup) for dispensing cold beverages. The water in the hot water tank is heated by an electrical heater, and the pump and compressor are each driven by an electric motor. Operation of such a vendor may present a problem where the vendor has a maximum current rating (i.e., a limit on the total current drawn by the vendor) and the normal combined current demand of the heater, pump and compressor may exceed said rating.

SUMMARY OF THE INVENTION

Accordingly, among the several objects of this invention may be noted the provision of a dual vendor such as described having means for maintaining the current drawn by the vendor within a predetermined limit (the maximum current rating of the vendor) even though there is a demand simultaneously for heating water in the hot water tank, for refrigeration, and for operation of the water pump; and the provision of a vendor with such means which does not adversely affect the capability of the vendor to dispense either a hot beverage or a cold beverage on demand.

In general, the invention involves the provision in such a vendor of means responsive to operation of one or the other of said pump and said compressor while there is a demand for heating water in the tank to reduce the current supplied to the heater so as to limit the total current drawn by the heater and the pump and compressor. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
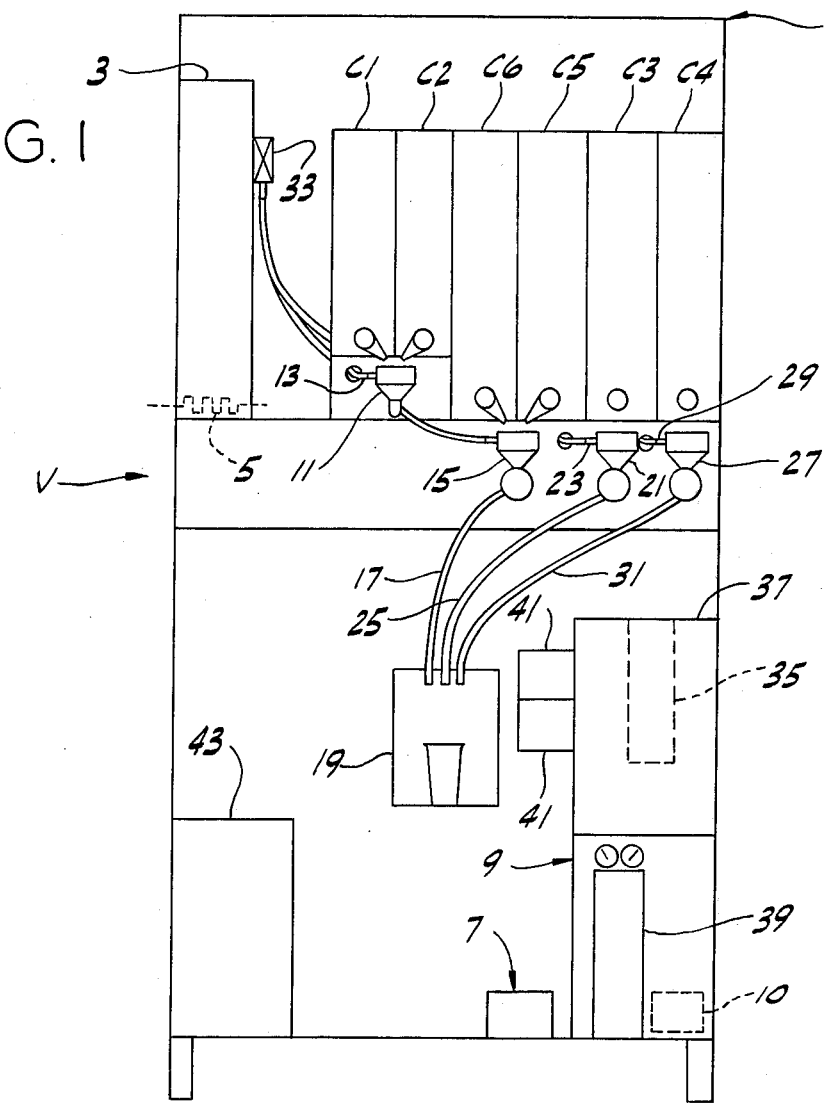
FIG. 1 is a view showing the principal components of a hot and cold beverage vendor in which the present invention is used.

Referring first to FIG. 1 of the drawings, there is generally indicated at V a hot and cold beverage vendor in which the invention is embodied, this vendor being shown as comprising a cabinet 1 having therein a hot water tank 3 having an electrical heater 5 associated therewith for heating water in the tank to constitute a supply of hot water for hot beverages, a pump 7 for pumping water for cold beverages, and a refrigeration system 9 for cooling water for cold beverages including a compressor 10. The pump is driven by an electric motor M1 (see FIG. 2) and the compressor is driven by an electric motor M2. These are a.c. motors.

As shown in FIG. 1, canisters C1–C4 are provided for supplies of dry instant tea, coffee, soup and chocolate to be mixed with hot water to constitute the hot beverages, and canisters C5 and C6 for sugar and lightener for the coffee and tea. Tea or coffee is augered from canisters C1 or C2, as the case may be, into a mixing bowl 11 supplied with hot water from the tank via a line 13, mixes with the hot water flowing through the bowl 11 to a second mixing bowl 15 where sugar and/or lightener drops in from canisters C5 and C6, the beverage flowing from bowl 15 via a line 17 to a cup at cup station 19. It will be understood that a suitable cup dispenser (not shown), which may be wholly conventional, is provided for dispensing cups to the cup station. Soup mix is augered from canister C3 into a mixing bowl 21 supplied with hot water from the tank via a line 23, mixes with the hot water flowing through this bowl, and the resultant soup flows from bowl 21 via a line 25 to a cup at cup station 19. Chocolate is augered from canister C4 into a mixing bowl 27 supplied with hot water from the tank via a line 29, mixes with the hot water flowing through this bowl, and the resultant hot chocolate beverage flows from bowl 27 via a line 31 to a cup at cup station 19. Suitable valve means 33, which may be wholly conventional, is provided for controlling the flow of hot water from the tank to the mixing bowls.

As further shown in FIG. 1, a carbonator 35, which may be wholly conventional, is provided for receiving tap water and carbonating it for supplying carbonated water for carbonated cold drinks. The carbonator is in a conventional water bath 37, which is maintained refrigerated for cooling the carbonated water in the carbonator by the refrigeration system 9. Tap water is supplied to the carbonator by the pump 7 on demand for water by the carbonater. Carbon dioxide gas is supplied to the carbonator from a tank 39. The pump may also supply cold tap water (uncarbonated) for plain or still (non-carbonated) cold beverages. Syrup pumps such as indicated at 41 are provided for pumping syrup from syrup canisters at 43 to mix with cold water (carbonated or plain) in a cup at station 19 to constitute cold beverages.

Figure 2:
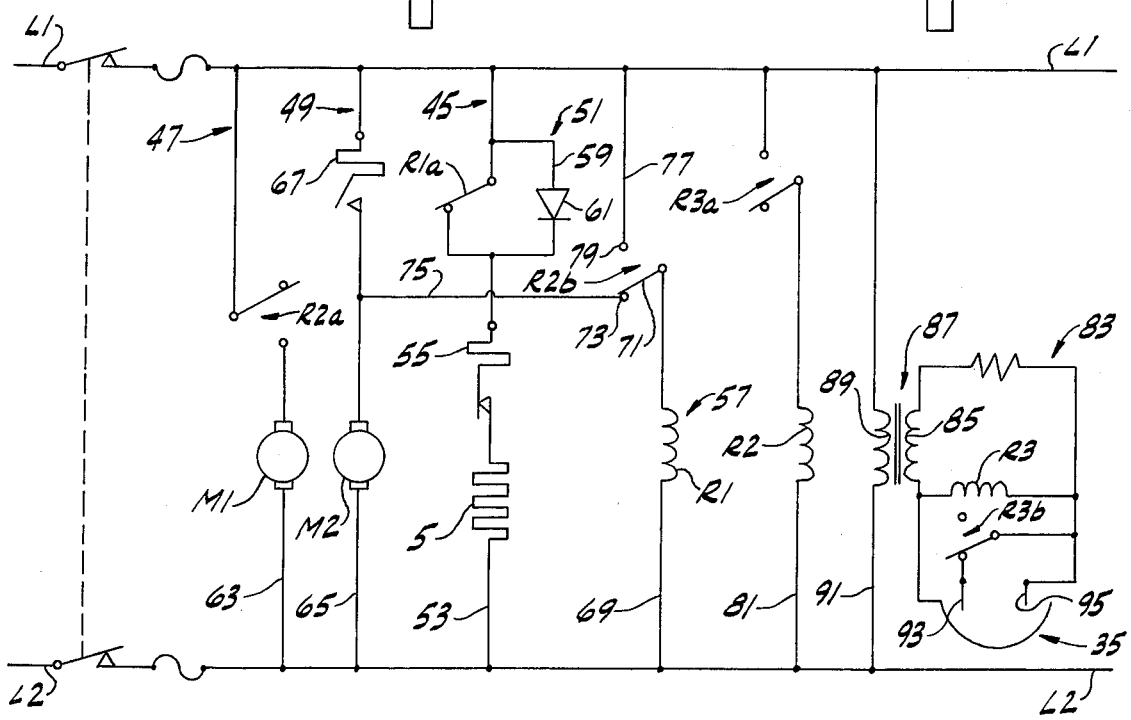
FIG. 2 is a wiring diagram.

Referring now to FIG. 2, means indicated generally at 45 is provided for supplying current to heater 5 upon a demand for heating water on the hot water tank 3. Means indicated generally at 47 is provided for supplying current to the pump motor M1 upon a demand for water for cold beverages (i.e., either from the carbonator 35 or a demand for tap water for a non-carbonated beverage). Means indicated generally at 49 is provided for supplying current to the compressor motor M2 upon a demand for refrigeration. Means indicated generally at 51 is provided responsive to operation of one of said pump and compressor motors M1 and M2 while there is a demand for heating water in the tank 3 to reduce the current supplied to the heater so as to limit the total current drawn by the heater and the two motors M1 and M2. More particularly, this current-reducing means is responsive to operation of either the pump motor M1 or the compressor motor M2, as will appear.

The means 45 for supplying the heater 5 with current comprises a line 53 connected across a source of alternating voltage (for supplying alternating current) indicated as power lines L1 and L2. Line 53 has an adjustable thermostatic switch 55 connected therein responsive to the temperature of water in the tank 3, and adpated to close when the temperature of the water falls below a predetermined value determined by the adjustment of the switch. The current-reducing means 51 comprises a set of normally closed contacts R1a connected in line 53, with means 57 for opening these contacts in response to operation of either the pump water M1 or the compressor motor M2, and a shunt 59 around these contacts with a diode 61 therein acting as a current limiting means. The diode is shunted when contacts R1a are closed. When contacts R1a open, the diode passes current only in one direction (e.g. from L1 to L2 and thus halves the normal heater current.

The means 47 for supplying current to the pump motor M1 comprises a line 63 connected across lines L1 and L2 having a set of contacts R2a therein of a relay R2 and the means for supplying current to the compressor motor comprises a line 65 connected across lines L1 and L2, having a thermostatic switch 67 connected therein adapted to close when there is a demand for refrigeration (from the water bath 37).

The means 57 for opening contacts R1a in the heater line 53 comprises a relay R1 connected across lines L1 and L2 for being energized to open contacts R1a when either of motors M1 or M2 is energized. Thus, relay R1 is connected in a line 69 between the movable contactor 71 of a set of double-throw contacts R2b of relay R2 and line L2. The movable contactor 71 is normally closed on the lower contact 73 of this set, and a line 75 interconnects said lower contact and line 65 between the thermostat 67 and the motor M2. A line 77 connects line L1 and the upper contact 79 of the set R2b. Relay R2 is connected across lines L1 and L2 in a line 81 including normally open contacts R3a of a relay R3. The latter is connected in a carbonator probe circuit 83 energized via the secondary 85 of a transformer 87 having its primary 89 connected in a line 91 across lines L1 and L2. The probe circuit 83 comprises a long probe 93 and a short probe 95. When the water level is at the lower end of the short probe, the relay R3 is shorted out via the water. When the water level falls below the lower end of the long probe, the short is removed and relay R3 is energized, resulting in closure of its contacts R3a and opening of a set of contacts R3b. As will appear, this results in operation of motor M1 to drive the pump 7 to pump water into the carbonator 35, and when the level of the water reaches the lower end of the short probe, the relay R3 is shorted out to open contacts R3a to deenergize motor M1 and to close contacts R3b.

Thermostatic switch 55 closes upon a demand for heating water in the tank 3 (i.e., when the temperature of the water drops below a predetermined value as determined by the setting of switch 55), and current is thereupon supplied to the heater 5 via line 53 to heat the water in the tank. As long as the pump motor M1 and the compressor motor M2 are not in operation, the current supplied to the heater 5 is full current via closed contacts R1a. Upon a demand for water by the carbonator, relay R3 is energized, thereby closing contacts R3a to energize relay R2 and thereby closing contacts R2a to energize the pump motor 1. Also, the movable contactor 71 of contacts R2b closes on contact 79 to energize relay R1 thereby opening contacts R1a, with the result that half current is supplied to the heater 5 via the diode 61. Upon closure of thermostatic switch 67 to energize the compressor motor M2, relay R1 is energized via the closed switch 67 and via the contactor 71 of the set of contacts R2b being closed on contact 73 to open contacts R1a, also with the result that half current is supplied to the heater 5 via the diode 61.

Thus, by halving the current drawn by the heater 5 if either the pump motor M1 or the compressor motor M2 is energized when there is a demand for heating water in the tank 3, the total current drawn by the vendor is limited and thus may be maintained below a maximum current rating such as may be imposed on the vendor. Even though the current drawn by the heater is halved on operation of the pump motor M1 or the compressor motor M2 (or both), the capability of the vendor to dispense a hot beverage is not generally adversely affected since usually the hot water tank has a relatively fast recovery, and the capability of the vendor to dispense a cold beverage is not adversely affected because operation of the pump motor and compressor motor is not affected.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A vendor for hot and cold beverages having a hot water tank, an electrical heater for heating water in the tank to constitute a supply of hot water for hot beverages, a pump for pumping water for cold beverages, an electric motor for driving the pump, a refrigeration system for cooling water for cold beverages including a compressor and an electric motor for driving the compressor, means for supplying current to the heater upon a demand for heating water in the tank, means for supplying current to the pump motor upon a demand for water for cold beverage, means for supplying current to the compressor motor upon a demand for refrigeration, and means responsive to operation of one of said pump and compressor motors while there is a demand for heating water in the tank to reduce the current supplied to the heater so as to limit the total current drawn by the heater and the two motors, said current-reducing means being responsive to operation of either the pump motor or the compressor motor, the means for supplying the heater with current comprising a line connected across a source of voltage, having a thermostatic switch connected therein responsive to the temperature of water in the tank, and said current-reducing means comprising a set of normally closed contacts in said line, means for opening said contacts in response to operation of either the pump motor or the compressor motor, and a shunt around said contacts having current limiting means therein, the means for supplying the heater with current supplying alternating current, and said current limiting means being a diode for halving the current drawn by the heater when said contacts are open.

* * * * *